United States Patent
Uotani et al.

(10) Patent No.: US 8,234,060 B2
(45) Date of Patent: Jul. 31, 2012

(54) NAVIGATION DEVICE FOR CARRYING OUT AN ALONG-ROUTE SCROLLING

(75) Inventors: Kazushi Uotani, Hyogo (JP); Katsuro Hayami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 12/920,615

(22) PCT Filed: Mar. 5, 2009

(86) PCT No.: PCT/JP2009/000998
§ 371 (c)(1),
(2), (4) Date: Sep. 2, 2010

(87) PCT Pub. No.: WO2009/144861
PCT Pub. Date: Dec. 3, 2009

(65) Prior Publication Data
US 2011/0015857 A1    Jan. 20, 2011

(30) Foreign Application Priority Data
May 27, 2008   (JP) ................................. 2008-138132

(51) Int. Cl.
*G01C 21/00* (2006.01)
*G01C 21/30* (2006.01)
*G06F 3/48* (2006.01)
(52) U.S. Cl. .......................... 701/201; 701/208; 715/781
(58) Field of Classification Search .................. None
See application file for complete search history.

(56) References Cited

U.S. PATENT DOCUMENTS

| | | | |
|---|---|---|---|
| 5,541,592 A | 7/1996 | Shiihara | |
| 5,612,881 A | 3/1997 | Moroto et al. | |
| 7,042,370 B2 | 5/2006 | Morie | |
| 2004/0039520 A1* | 2/2004 | Khavakh et al. | 701/201 |
| 2004/0183700 A1 | 9/2004 | Morie | |
| 2006/0112350 A1* | 5/2006 | Kato | 715/781 |
| 2007/0250264 A1* | 10/2007 | Sekine et al. | 701/208 |
| 2007/0276596 A1* | 11/2007 | Solomon et al. | 701/211 |
| 2008/0046165 A1* | 2/2008 | Downs et al. | 701/117 |
| 2008/0071465 A1* | 3/2008 | Chapman et al. | 701/117 |
| 2008/0215240 A1* | 9/2008 | Howard et al. | 701/213 |

FOREIGN PATENT DOCUMENTS

| | | | |
|---|---|---|---|
| EP | 2101154 A1 | 9/2009 | |
| JP | 7-55482 A | 3/1995 | |
| JP | 7-260505 A | 10/1995 | |

(Continued)

*Primary Examiner* — Thomas Tarcza
*Assistant Examiner* — Nagi Murshed
(74) *Attorney, Agent, or Firm* — Birch, Stewart, Kolasch & Birch, LLP

(57) ABSTRACT

A navigation device includes: an along-route scroll mode determining unit 44 for determining whether or not a cursor on a screen is placed on a guidance route; a thick line highlight processing unit 45 for, when the cursor is placed on the guidance route, making a transition to an along-route scroll mode to highlight a line segment of the cursor indicating a direction of a destination and another line segment of the cursor extending in a direction opposite to that of the line segment; and a scroll processing unit 46 for, when a direction key indicating the direction of the thick-highlighted line segment indicating the direction of the destination, scrolling the map toward the direction of the destination, and for, when a direction key indicating the direction of the other line segment, scrolling the map toward the direction of a place of departure.

5 Claims, 12 Drawing Sheets

FOREIGN PATENT DOCUMENTS

| | | |
|---|---|---|
| JP | 11-295085 A | 10/1999 |
| JP | 2000-180192 A | 6/2000 |
| JP | 2001-165674 A | 6/2001 |
| JP | 2002-22470 A | 1/2002 |
| JP | 2002-31539 A | 1/2002 |
| JP | 2002-310706 A | 10/2002 |
| JP | 2004-212255 A | 7/2004 |
| JP | 2005-55288 A | 3/2005 |
| JP | 2005-181558 A | 7/2005 |
| JP | 2005-233972 A | 9/2005 |
| JP | 2006-214939 A | 8/2006 |
| JP | 2006-214980 A | 8/2006 |
| JP | 2006-317458 A | 11/2006 |
| JP | 2008-51577 A | 3/2008 |

* cited by examiner

FIG.4
(a) 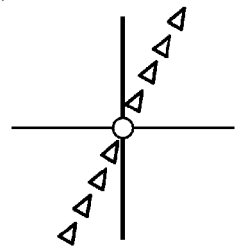
4-Direction Cursor
(b) 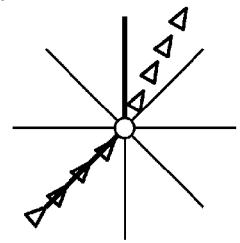
8-Direction Cursor
FIG.5
(a) 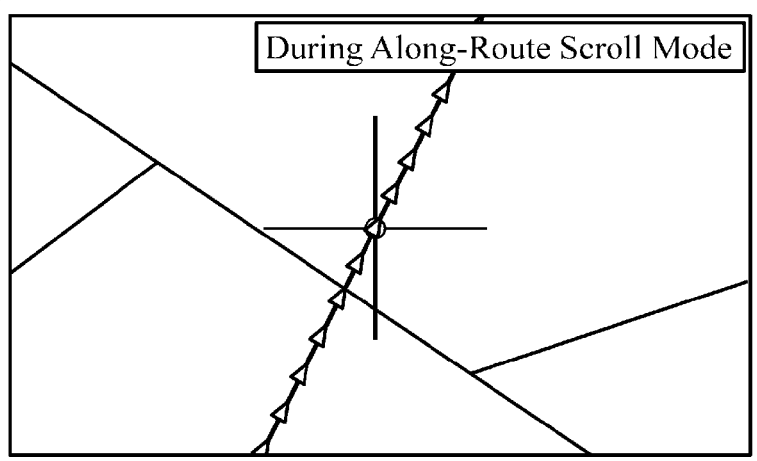
(b) 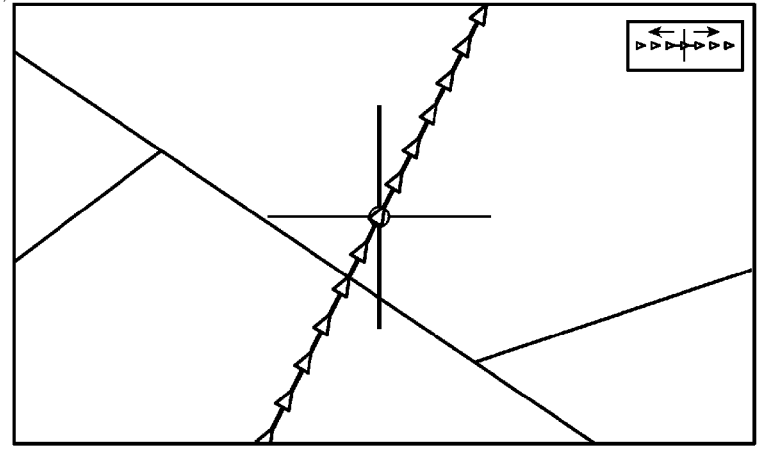

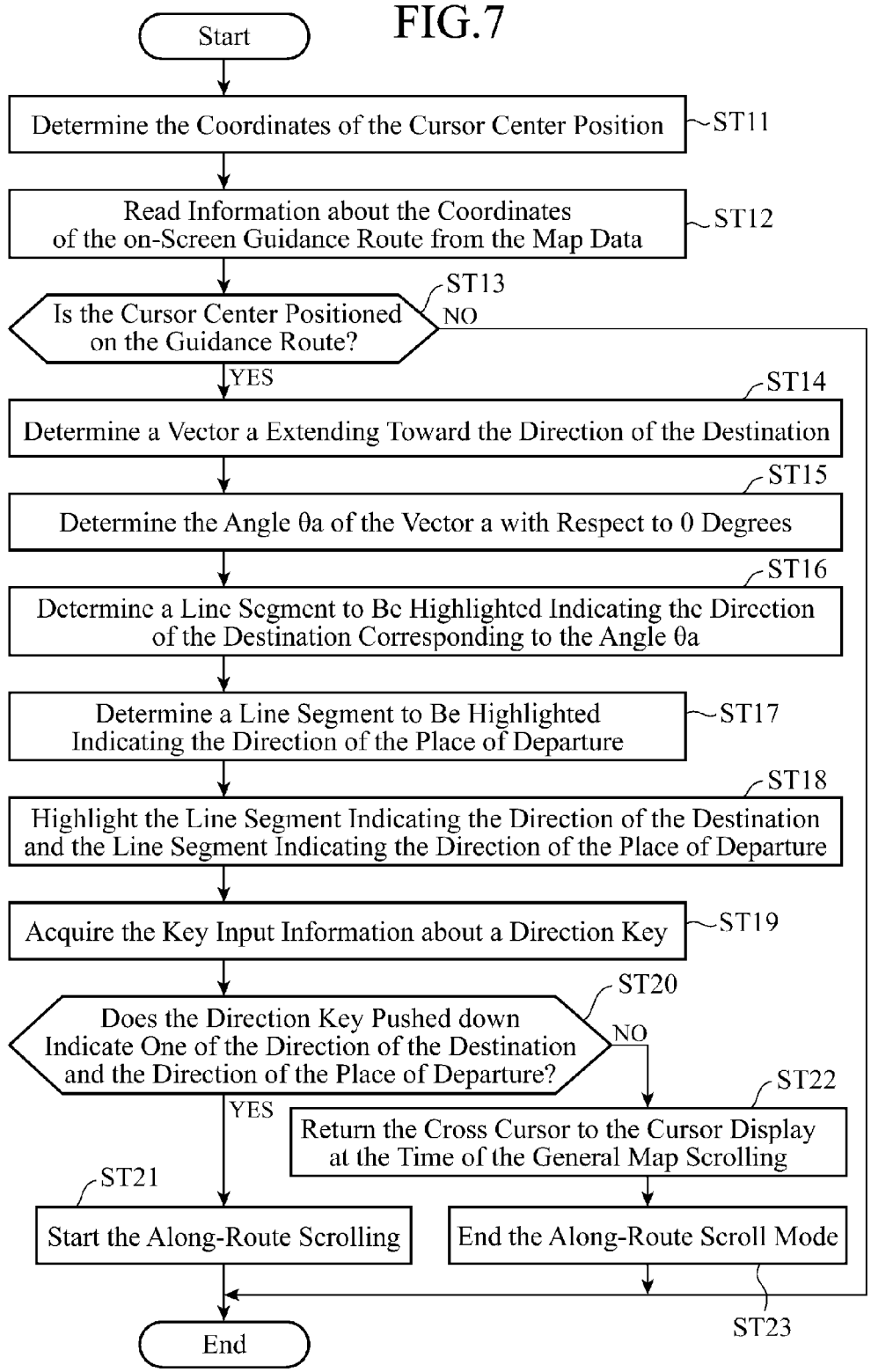

FIG.8

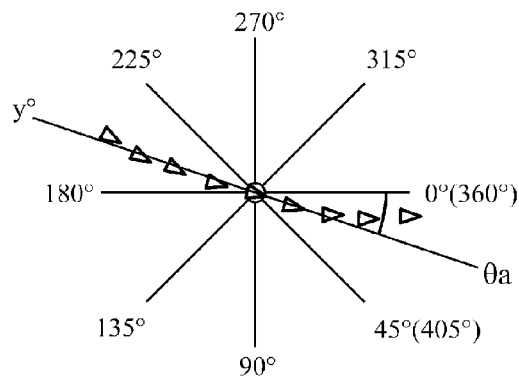

FIG.9

| Angle θa of Direction of the Destination | Line Segment to Be Highlighted Indicating Direction of Destination | Line Segment to Be Highlighted Indicating Direction of Place of Departure |
|---|---|---|
| 315°＜θa＜405° | Right-Side Line Segment | Left-Side Line Segment (Opposite to Line Segment Shown in Left-Side Column) |
| 45°≦θa≦135° | Lower-Side Line Segment | Upper-Side Line Segment (Opposite to Line Segment Shown in Left-Side Column) |
| 135°＜θa＜225° | Left-Side Line Segment | Right-Side Line Segment (Opposite to Line Segment Shown in Left-Side Column) |
| 225°≦θa≦315° | Upper-Side Line Segment | Lower-Side Line Segment (Opposite to Line Segment Shown in Left-Side Column) |

FIG.10

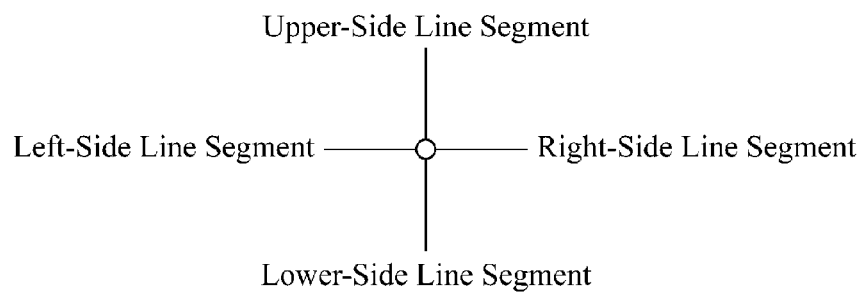

NAVIGATION DEVICE FOR CARRYING OUT AN ALONG-ROUTE SCROLLING

FIELD OF THE INVENTION

The present invention relates to a navigation device that guides a user to his or her destination along a guidance route. More particularly, it relates to a technology of scrolling a map displayed on a screen.

BACKGROUND OF THE INVENTION

Conventionally, a navigation device that places a cross cursor on a guidance route on a map displayed on the screen of a display unit according to a user's command to enable the user to specify a scroll direction by using, for example, either one of four direction keys of a remote controller (abbreviated as a "remote control" from here on) to scroll the map along the guidance route (referred to as "along-route scroll" from here on) is known. For example, patent reference 1 discloses a navigation device that can efficiently display a point which is a target on a map through a brief operation, thereby being able to improve the operativity of the navigation device.

This navigation device has a first scroll mode in which, when an arbitrary point on a map image displayed on the display screen of a display is touched, the navigation device performs a one-touch scroll operation of placing a cursor at the point touched and scrolling the map image in such a way that the point is positioned at the center of the screen, and an 8-direction scroll operation of scrolling the map image on the display screen toward a direction shown by an arrow key pushed down, and a second scroll mode in which when the navigation device is providing route guidance, the navigation device performs a simulation scroll operation of scrolling the map image along the route being provided for the user, otherwise scrolling the map image along the road along which the vehicle is travelling to perform a learning scroll operation of storing the route.

Furthermore, patent reference 2 discloses a navigation device that, when a user checks a guidance route, scrolls a map along the guidance route automatically even if the user does not perform a scroll operation of scrolling the map along the shape of the guidance route. This navigation device sets a desired point as a destination and searches for a guidance route leading to this destination, and also scrolls and displays a map image according to movements of the position of a cursor. The navigation device is provided with a commanding means for issuing a command to move the cursor position, a determining means for determining whether the cursor position has moved to the vicinity of the guidance route according to the cursor position movement command issued by the above-mentioned commanding means, and a scroll control means for, when this determining means determines that the cursor position has moved to the vicinity of the guidance route, carrying out scroll control along this guidance route, and reducing the scroll rate as the cursor gets close to an intersection on this guidance route.

[Patent reference 1] JP,2006-214980,A
[Patent reference 2] JP,2002-22470,A

However, the conventional navigation devices which can carry out a scroll operation of scrolling a map along the route have the following problems. That is, in conventional along-route scrolling, when a cross cursor is placed at a slightly-curved portion of the guidance route, because directions along which the along-route scrolling can be carried out can be shown by highlighting two corresponding line segments of the cross cursor, the user is enabled to perform an along-route scroll operation of scrolling a map along either of the two directions: the direction of the destination and the direction of the place of departure by specifying one of the directions shown by direction keys. In contrast with this, when the cross cursor is placed at an acutely-curved portion of the guidance route, only one highlighted line segment of the cross cursor indicates the direction along which the along-route scrolling operation can be carried out because the direction of the destination and the direction of the place of departure which can be shown by the cross cursor get closer to each other. As a result, a problem is that only one direction can be shown by using the direction keys of the cross cursor, and the along-route scroll operation can be carried out only along the direction of the destination.

Furthermore, according to an existing along-route scroll method, when the user manually stops the scrolling of a map in the vicinity of the guidance route while operating the map scrolling, the navigation device makes a transition to an operation mode of along-route scroll (referred to as an "along-route scroll mode" from here on) because the cross cursor overlaps the guidance route. Because this transition is not necessarily an operation which the user desires, this causes a problem as a non-intended operation.

Furthermore, according to an existing along-route scroll method, when releasing the along-route scroll mode, the user is allowed to push down a direction key other than the direction keys respectively used for scrolling the map toward the direction of the destination and the direction of the place of departure to make the cross cursor leave the guidance route. A problem is however that because a direction key is typically used for moving a cursor in a menu or scrolling a map during a navigation operation, but is rarely used to break away from or release a certain function, it is hard for some users to understand how to release the along-route scroll mode.

In addition, according to an existing along-route scroll method, the user can know whether or not the navigation device is placed in the along-route scroll mode only from a change in the display form of the cross cursor, such as a change of the color of the cross cursor or highlighting of a line segment of the cross cursor with thickening of the line segment. A problem is therefore that it is hard for some users to understand whether or not the navigation device is placed in the along-route scroll mode only from a change in the display form of the cross cursor.

The present invention is made in order to solve the above-mentioned problems, and it is therefore an object of the present invention to provide a navigation device that can carry out an along-route scroll operation in either of both directions, such as the direction of the destination and the direction of the place of departure, regardless of the shape of the guidance route, and that provides excellent user-friendliness.

DESCRIPTION OF THE INVENTION

In order to solve the above-mentioned problems, a navigation device in accordance with the present invention includes: a route search processing unit for searching for a guidance route leading from a place of departure to a destination; a display unit for displaying the guidance route which is searched for by the route search processing unit on a map; an along-route scroll mode determining unit for determining whether or not a cursor having a plurality of line segments extending respectively in a plurality of directions formed on a screen of the display unit is placed on the guidance route which is searched for by the route search processing unit; a highlight processing unit for, when the along-route scroll mode determining unit determines that the cursor is placed on the guidance route, making a transition to an along-route scroll mode to highlight both a line segment of the cursor extending in a direction of the destination and a line segment of the cursor extending in a direction opposite to that of the line segment; an input unit having a plurality of direction keys indicating a plurality of directions respectively; a scroll processing unit for, when a direction key of the input unit indicating a same direction as the line segment of the cursor extending in the direction of the destination which is highlighted by the highlight processing unit is pushed down, scrolling the map toward the direction of the destination along the guidance route, and for, when a direction key of the input unit indicating a same direction as the line segment of the cursor extending in the direction opposite to that of the line segment of the cursor extending in the direction of the destination, scrolling the map toward the direction of the place of departure along the guidance route; and a display processing unit for displaying the map on which the scroll process is performed by the scroll processing unit on the display unit.

The navigation device in accordance with the present invention is configured in such a way as to make a transition to the along-route scroll mode, thicken and highlight both the line segment indicating the direction of the destination of the cross cursor, and the line segment indicating the direction opposite to that of the above-mentioned line segment, when the direction key indicating the same direction as that of the thickened and highlighted line segment of the cross cursor extending in the direction of the destination is pushed down, scroll the map toward the direction of the destination along the guidance route, and, when the direction key indicating the same direction as that of the line segment extending in the direction opposite to that of the line segment of the cross cursor extending in the direction of the destination is pushed down, scroll the map toward the direction of the place of departure along the guidance route. Therefore, the navigation device in accordance with the present invention can carry out the along-route scrolling in either of both directions, such as the direction of the destination and the direction of the place of departure, regardless of the shape of the guidance route, thereby improving the user-friendliness of the navigation device.

BRIEF DESCRIPTION OF THE FIGURES

FIG. 4 is a view showing a display form of a cursor for use in the navigation device in accordance with Embodiment 1 of the present invention;

FIG. 5 is a view for explaining a text or icon which is displayed on a map screen in the navigation device in accordance with Embodiment 1 of the present invention;

FIG. 7 is a flow chart showing a highlighting process of highlighting cursor line segments which is performed by the navigation device in accordance with Embodiment 1 of the present invention;

FIG. 8 is a view for explaining determination of a destination which is carried out by the navigation device in accordance with Embodiment 1 of the present invention;

FIG. 9 is a view for explaining a table used for the determination of a destination which is carried out by the navigation device in accordance with Embodiment 1 of the present invention;

FIG. 10 is a view for explaining the definition of terms used in the table used for the determination of a destination which is carried out by the navigation device in accordance with Embodiment 1 of the present invention;

PREFERRED EMBODIMENTS OF THE INVENTION

Hereafter, the preferred embodiments of the present invention will be explained in detail with reference to the drawings.

Embodiment 1

Figure 1:
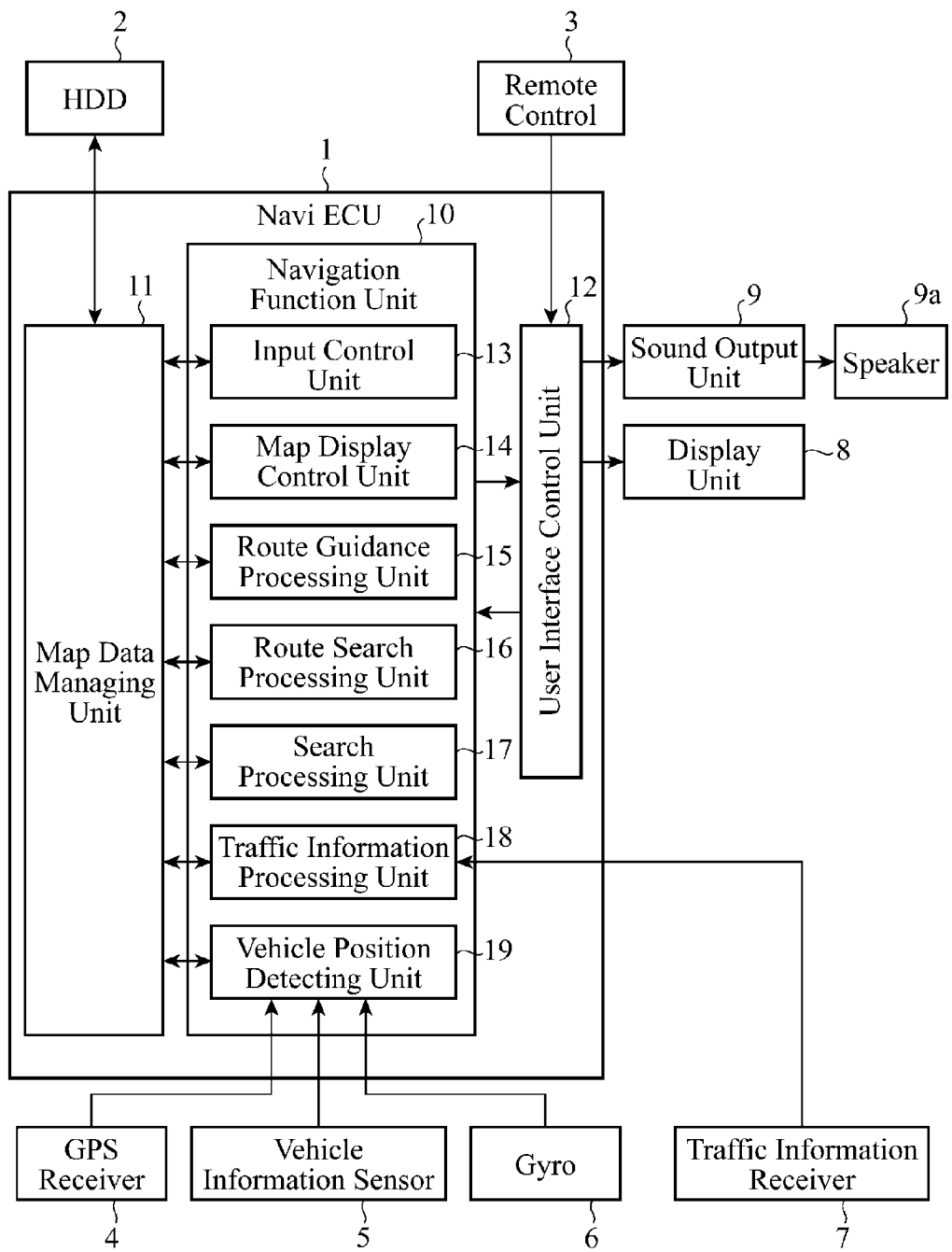
FIG. 1 is a block diagram showing the whole configuration of a navigation device in accordance with Embodiment 1 of the present invention.

FIG. 1 is a block diagram showing the whole configuration of a navigation device in accordance with Embodiment 1 of the present invention. This navigation device is provided with a navigation ECU (Electronic Control Unit) (abbreviated as a "navi ECU" from here on) 1, an HDD (Hard Disk Drive) 2, a remote control 3, a GPS receiver 4, a vehicle information sensor 5, a gyro 6, a traffic information receiver 7, a display unit 8, a sound output unit 9, and a speaker 9a.

The navi ECU 1 controls the whole of this navigation device. The details of this navi ECU 1 will be mentioned below.

The HDD 2 stores map data therein. A locator database (abbreviated as "DB" from here on), a route search DB, a route guidance DB, a map display DB, a search DB, etc. are included in the map data. Instead of the HDD 2, a CD (Compact Disc) drive or a DVD (Digital Versatile Disk) drive can be used. In this case, the map data are recorded into the CD or the DVD. Map data stored in this HDD 2 can be read by the navi ECU 1.

Figure 2:
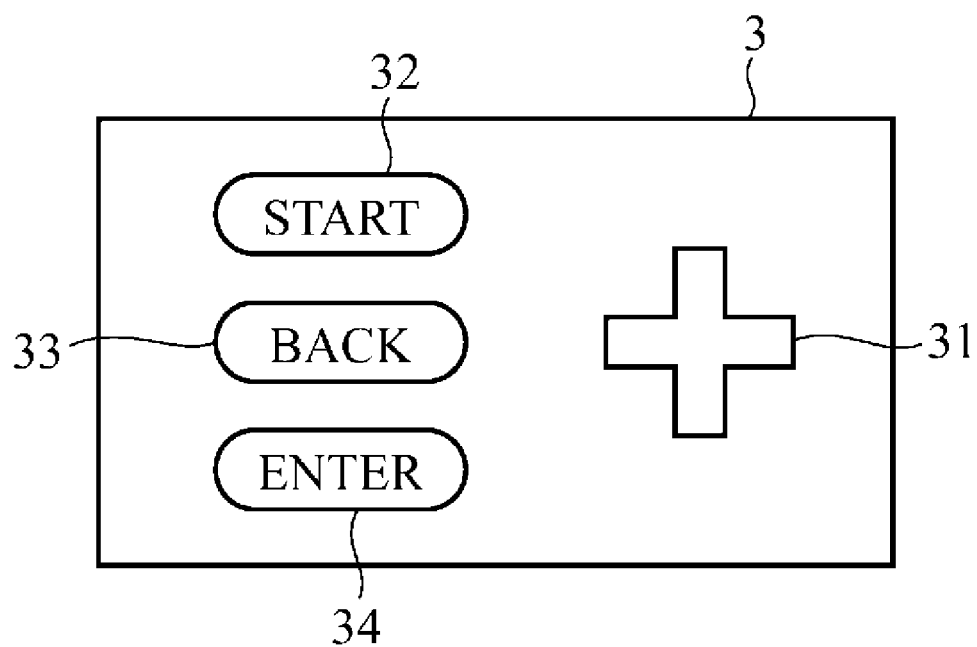
FIG. 2 is a view showing the configuration of a remote control for use in the navigation device in accordance with Embodiment 1 of the present invention.

The remote control 3 corresponds to an input unit in accordance with the present invention. For example, as shown in FIG. 2, the remote control 3 includes an operation key 31 which can be manipulated in either one of four directions which are upward, downward, leftward and rightward directions, a start key (START) 32, a back key (BACK) 33, and an enter key (ENTER) 34. The operation key 31 is comprised of four direction keys indicating the four directions which are upward, downward, leftward and rightward directions, and is used in order for the user to command the navigation device to move a cursor on the screen of the display unit 8, and to specify the direction of scrolling a map, for example. The start key 32 is used in order for the user to cause the navigation device to start an operation. The back key 33 is used in order for the user to cause the navigation device to return a process or the like which the navigation device has performed previously. The enter key 34 is used in order for the user to cause the navigation device to confirm an entry. Operation data generated through the user's operation on this remote control 3 are sent to the navi ECU 1.

The GPS receiver 4 receives signals from GPS satellites to detect the current position of a vehicle. The current position of the vehicle detected by this GPS receiver 4 is informed to the navi ECU 1 as current position data.

The vehicle information sensor 5 detects the position of the operator in the vehicle. This vehicle information sensor 5 can consist of, for example, a seat sensor for detecting that a person is seated, a camera system for detecting a person's position from an image of the vehicle's interior which the camera system has captured, or the like. The operator's position detected by this vehicle information sensor 5 is informed to the navi ECU 1 as operator position data.

The gyro 6 detects the traveling direction of the vehicle. The traveling direction of the vehicle detected by this gyro 6 is informed to the navi ECU 1 as traveling direction data.

The traffic information receiver 7 receives a traffic information signal transmitted from, for example, a teleterminal in a road traffic data communications system (VICS: Vehicle Information and Communication System). The traffic information received by this traffic information receiver 7 is sent to the navi ECU 1 as traffic information data.

The display unit 8 is comprised of, for example, an LCD (Liquid Crystal Display), and displays a map, a vehicle position mark, and other messages according to a display signal sent thereto from the navi ECU 1.

The sound output unit 9 creates a sound signal according to sound data sent from the navi ECU 1, and sends the sound signal to the speaker 9a. The speaker 9a converts the sound signal from the sound output unit 9 into sound, and outputs the sound. Accordingly, various guidance messages are generated via voice from the speaker 9a.

Next, the details of the navi ECU 1 will be explained. The navi ECU 1 is comprised of, for example, a microcomputer. This navi ECU 1 is provided with a navigation function unit 10, a map data managing unit 11, and a user interface control unit 12 which are implemented via software processing.

The navigation function unit 10 performs a process of implementing various navigation functions. The details of this navigation function unit 10 will be mentioned below.

The map data managing unit 11 reads map data from the HDD 2 in response to a request from the navigation function unit 10, processes the map data as needed, and sends the processed map data to the navigation function unit 10. The map data managing unit 11 also writes map data sent thereto from the navigation function unit 10 in the HDD 2 in response to a request from the navigation function unit 10 after processing the map data as needed.

The user interface control unit 12 accepts the user's request inputted from the remote control 3, creates a control command according to the descriptions of the request, and sends the control command to the navigation function unit 10. The user interface control unit 12 also sends processed results, which are returned from the navigation function unit 10 in response to the control command, to the display unit 8 and/or the sound output unit 9. As a result, while the information which the user has requested is displayed on the display unit 8, a message via voice is outputted from the speaker 9a.

Next, the details of the navigation function unit 10 will be explained. The navigation function unit 10 is provided with an input control unit 13, a map display control unit 14, a route guidance processing unit 15, a route search processing unit 16, a search processing unit 17, a traffic information processing unit 18, and a vehicle position detecting unit 19. Because transmission and reception of data among these components are carried out via the map data managing unit 11, any description about transmission and reception of data via the map data managing unit 11 will be omitted hereafter.

The input control unit 13 performs a process according to the user's request sent thereto, via the user interface control unit 12, from the remote control 3. The results of the process performed by this input control unit 13 are informed to the map data managing unit 11 and the user interface control unit 12.

While the map display control unit 14 creates display data for display of a map on the basis of map data which the map display control unit has acquired from the HDD 2 via the map data managing unit 11, the map display control unit 14 creates display data for display of a guidance route on the basis of route data sent thereto from the route search processing unit 16 and also creates display data for display of a cursor, etc. on the basis of key input information sent thereto from the remote control 3 via the user interface control unit 12 and the input control unit 13. The display data created by this map display control unit 14 are sent to the display unit 8 via the user interface control unit 12. This map display control unit 14 will be further explained below in detail.

The route guidance processing unit 15 acquires map data from the HDD 2 via the map data managing unit 11, and carries out a process for the route guidance. The results of the process performed by this route guidance processing unit 15 are informed to the display unit 8 and the sound output unit 9 via the user interface control unit 12.

The route search processing unit 16 sets the vehicle position shown by the vehicle position data detected by the vehicle position detecting unit 19 as the place of departure, and searches for a route leading to the destination shown by destination data sent thereto from the searching processing unit 17 on the basis of the map data acquired from the HDD 2 via the map data managing unit 11. The route which is searched for by this route search processing unit 16 is informed to the map display control unit 14 as the route data.

The searching processing unit 17 searches for the destination which is shown by the key input information sent thereto from the remote control 3 via the user interface control unit 12 and the input control unit 13 on the basis of the map data acquired from the HDD 2 via the map data managing unit 11, and sends the search results to the route search processing unit 16 as the destination data.

The traffic information processing unit 18 acquires map data from the HDD 2 via the map data managing unit 11, and carries out a process for display of traffic congestion points on the acquired map data on the basis of the traffic information sent thereto from the traffic information receiver 7. The results of the process performed by this traffic information processing unit 18 are sent to the map display control unit 14.

The vehicle position detecting unit 19 determines the vehicle position on the basis of the current position data sent thereto from the GPS receiver 4, the operator position data acquired from the vehicle information sensor 5, and the traveling direction data acquired from the gyro 6, and informs the vehicle position to the route search processing unit 16 as vehicle position data.

Figure 3:
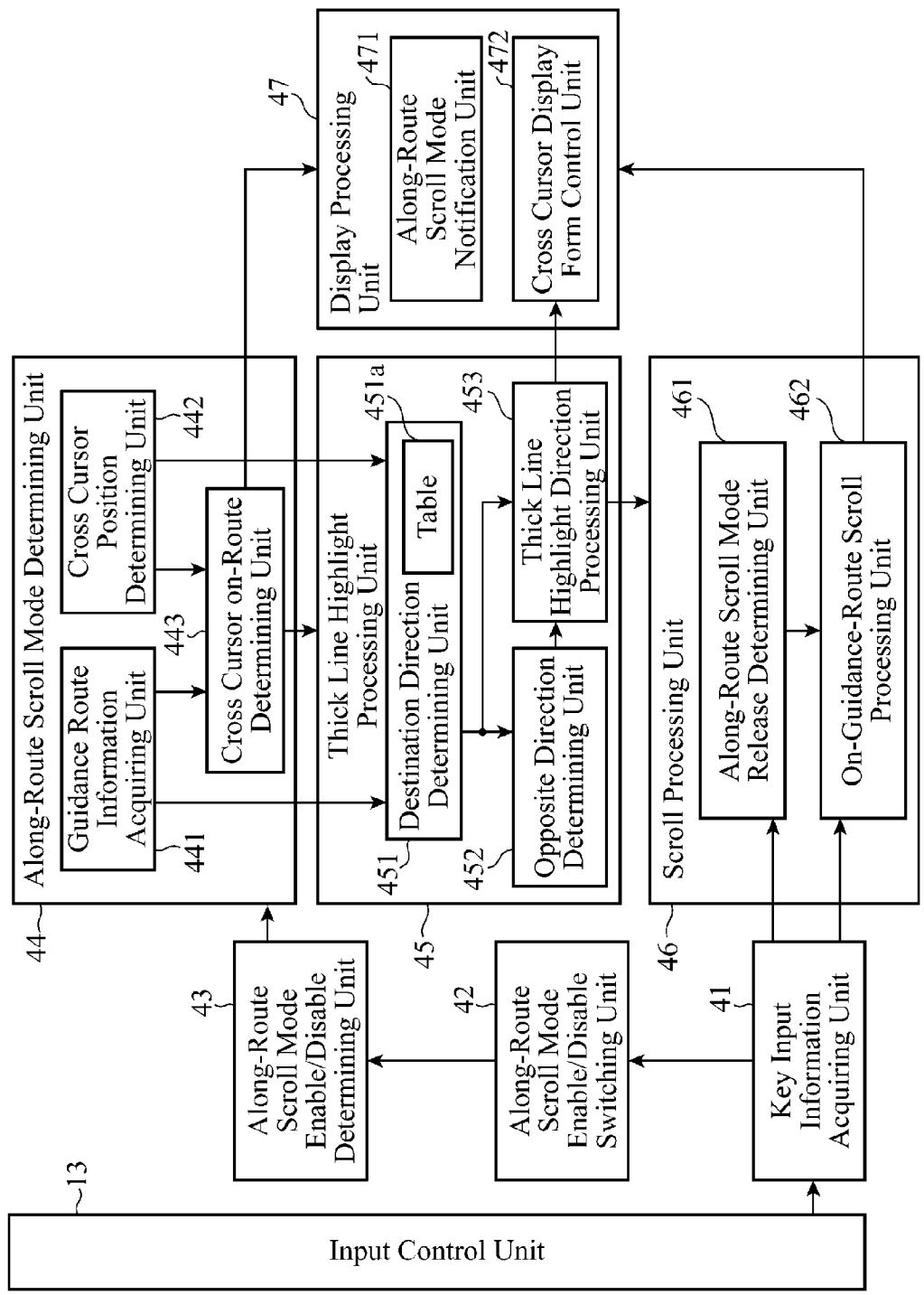
FIG. 3 is a functional block diagram showing only a main part extracted from and directly related to the navigation device in accordance with Embodiment 1 of the present invention.

Next, a portion directly related to the present invention of the navigation device constructed as mentioned above will be explained in detail. FIG. 3 is a functional block diagram showing only a main part extracted and directly related to the present invention of the navigation device in accordance with Embodiment 1.

This navigation device is provided with a key input information acquiring unit 41, an along-route scroll mode enable/disable switching unit 42, an along-route scroll mode enable/disable determining unit 43, an along-route scroll mode determining unit 44, a thick line highlight processing unit 45, a scroll processing unit 46, and a display processing unit 47. These components are implemented mainly within the map display control unit 14.

The key input information acquiring unit 41 acquires the key input information sent thereto, via the user interface control unit 12 and the input control unit 13, from the remote control 3. The key input information acquired by this key input information acquiring unit 41 is sent to the along-route scroll mode enable/disable switching unit 42 and the scroll processing unit 46.

The along-route scroll mode enable/disable switching unit 42 sets whether to enable or disable along-route scrolling in response to an operation on a not-shown operation panel, more concretely, in response to the key input information sent from the operation panel via the user interface control unit 12, the input control unit 13, and the key input information acquiring unit 41. Information showing whether to enable or disable the along-route scrolling, which is set by this along-route scroll mode enable/disable switching unit 42, is sent to the along-route scroll mode enable/disable determining unit 43.

The along-route scroll mode enable/disable determining unit 43 acquires the information showing whether to enable or disable the along-route scrolling, which is set by the along-route scroll mode enable/disable switching unit 42, and, when the information shows that the along-route scroll mode is enabled, starts the along-route scroll mode determining unit 44.

The along-route scroll mode determining unit 44 starts a process when started by the along-route scroll mode enable/disable determining unit 43. This along-route scroll mode determining unit 44 is provided with a guidance route information acquiring unit 441, a cross cursor position determining unit 442, and a cross cursor on-route determining unit 443.

The guidance route information acquiring unit 441 acquires coordinate information including the coordinates of nodes at both ends of each link of the guidance route displayed on the display unit 8, i.e., the route shown by the route data acquired from the route search processing unit 16, and sends the coordinate information to the cross cursor on-route determining unit 443 and the thick line highlight processing unit 45.

The cross cursor position determining unit 442 determines coordinates of the center position of cross cursor currently displayed on the display unit 8, and sends them to the cross cursor route top determining unit 443 and the thick line highlight processing unit 45.

The cross cursor on-route determining unit 443 determines whether or not the center of the cross cursor is positioned on the guidance route on the basis of both the coordinate information sent thereto from the guidance route information acquiring unit 441, and the coordinates of the center position of the cross cursor which are informed thereto from the cross cursor position determining unit 442, and, when determining that the center of the cross cursor is positioned on the guidance route, commands the thick line highlight processing unit 45 and the display processing unit 47 to start the along-route scroll mode.

The thick line highlight processing unit 45 starts a process according to the command from the along-route scroll mode determining unit 44. This thick line highlight processing unit 45 is provided with a destination direction determining unit 451, an opposite direction determining unit 452, and a thick line highlight direction processing unit 453.

The destination direction determining unit 451 determines a vector starting from the coordinates of the center position of the cross cursor which are informed thereto from the cross cursor position determining unit 442 of the along-route scroll mode determining unit 44 from the coordinates of the nodes of the link of the guidance route extending toward the direction of the destination, the coordinates being included in the coordinate information sent from the guidance route information acquiring unit 441 of the along-route scroll mode determining unit 44, so as to determine a line segment of the cross cursor extending in a direction which is the closest to the direction of this vector with reference to a pre-stored table 451a as shown in FIG. 9. Information showing the line segment of the cross cursor determined by this destination direction determining unit 451 is sent to both the opposite direction determining unit 452 and the thick line highlight direction processing unit 453.

In the navigation device in accordance with this Embodiment 1, the line segments of the cross cursor are extending in the four directions which are upward, downward, leftward and rightward directions, as shown in FIG. 4(a). As an alternative, a cursor having line segments extending in eight directions as shown in, for example, FIG. 4(b) or a cursor which is subdivided into a larger number of line segments can be used.

The opposite direction determining unit 452 determines the line segment of the cross cursor having an opposite relationship with the line segment of the cross cursor shown by the information showing the line segment of the cross cursor sent from the destination direction determining unit 451 (i.e., the line segment which is symmetric to the line segment shown by the information with respect to the center position of the cross cursor). Information showing the line segment of the cross cursor determined by this opposite direction determining unit 452 is sent to the thick line highlight direction processing unit 453.

The thick line highlight direction processing unit 453 determines the direction key of the remote control 3 corresponding to the line segment of the cross cursor shown by the information showing the line segment of the cross cursor sent from the destination direction determining unit 451 so as to define the direction key as a direction key for scrolling the map toward the direction of the destination. The thick line highlight direction processing unit also determines the direction key of the remote control 3 corresponding to the line segment of the cross cursor shown by the information showing the line segment of the cross cursor sent from the opposite direction determining unit 452 so as to define the direction key as a direction key for scrolling the map toward the direction of the place of departure. Information showing the direction key indicating the direction of the destination and the direction key indicating the direction of the place of departure which are determined by this thick line highlight direction processing unit 453 is sent to both the scroll processing unit 46 and the display processing unit 47.

The scroll processing unit 46 is provided with an along-route scroll mode release determining unit 461 and an on-guidance-route scroll processing unit 462.

When receiving the key input information about a key different from the direction key which was used at the time of switching to the along-route scroll mode from the key input information acquisition section 41 during the along-route scroll mode (e.g., the back key 33 of the remote control 3), the along-route scroll mode release determining unit 461 determines that the along-route scroll mode has been released and informs the on-guidance-route scroll processing unit 462 that the along-route scroll mode has been released.

While receiving the key input information showing that the direction key is being pushed down from the key input information acquiring unit 41, the on-guidance-route scroll processing unit 462 performs a process of causing the display processing unit to carry out the along-route scroll continuously toward either the direction of the destination or the direction of the place of departure according to the information showing either the direction key indicating the direction of the destination or the direction key indicating the place of departure sent from the thick line highlight direction processing unit 453 of the thick line highlight processing unit 45. Furthermore, when receiving the notification showing that the along-route scroll mode has been released from the along-route scroll mode release determining unit 461, the on-guidance-route scroll processing unit performs a process of stopping the along-route scrolling. The results of the process performed by this on-guidance-route scroll processing unit 462 are sent to the display processing unit 47.

The display processing unit 47 creates display data showing map scrolling on the basis of the process results sent from the on-guidance-route scroll processing unit 462 of the scroll processing unit 46, and sends the display data to the display unit 8 via the user interface control unit 12. This display processing unit 47 is provided with an along-route scroll mode notification unit 471 and a cross cursor display form control unit 472.

When commanded to start the along-route scroll mode by the cross cursor on-route determining unit 443 of the along-route scroll mode determining unit 44, the along-route scroll mode notification unit 471 displays a text showing that the along-route scrolling is working, as shown in FIG. 5(*a*), or an icon showing that the along-route scrolling is working, as shown in FIG. 5(*b*), on the screen of the display unit 8.

Furthermore, when receiving the notification showing that the along-route scroll operation has been stopped from the on-guidance-route scroll processing unit 462 of the scroll processing unit 46, the along-route scroll mode notification unit 471 deletes the text or icon showing that the along-route scrolling is working from the screen of the display unit 8.

The cross cursor display form control unit 472 corresponds to a cursor display form control unit in accordance with the present invention, and, when commanded to start the along-route scroll mode by the cross cursor on-route determining unit 443 of the along-route scroll mode determining unit 44, switches from a cursor display at the time of a general map scroll mode to a cursor display at the time of the along-route scroll mode. At this time, on the basis of the information showing the direction key indicating the direction of the destination and the direction key indicating the direction of the place of departure which is sent from the thick line highlight direction processing unit 453 of the thick line highlight processing unit 45, the cross cursor display form control unit displays the line segments respectively corresponding to the direction of the destination and the direction of the place of departure in different forms, as shown in, for example, FIG. 6, which can be distinguished from each other (displays the line segment indicating the direction of destination with a line having an arrow while displaying the line segment indicating the direction of the place of departure with a line having no arrow). When receiving the notification showing that the along-route scroll operation has been stopped from the on-guidance-route scroll processing unit 462 of the scroll processing unit 46, the cross cursor display form control unit 472 returns to the cursor display at the time of the general map scroll mode.

Next, the operation of the navigation device in accordance with Embodiment 1 of the present invention constructed as mentioned above will be explained with the operation being divided into some main processes.

(1) A Highlighting Process of Highlighting Cursor Line Segments

FIG. 7 is a flow chart showing the highlighting process of highlighting cursor line segments when the cross cursor is positioned on the guidance route in the along-route scroll.

In the highlighting process, the coordinates of the center position of the cursor are determined first (step ST11). More specifically, the cross cursor position determining unit 442 of the along-route scroll mode determining unit 44 determines the coordinates of the center position of the cross cursor displayed on the display unit 8, and informs the coordinates to both the cross cursor on-route determining unit 443 and the thick line highlight processing unit 45.

Information about the coordinates of the on-screen guidance route is then read from the map data (step ST12). More specifically, the guidance route information acquiring unit 441 acquires coordinate information including the coordinates of nodes at both ends of each link of the guidance route displayed on the display unit 8, and sends the coordinate information to both the cross cursor on-route determining unit 443 and the thick line highlight processing unit 45.

Whether or not the cursor center is positioned on the guidance route is then checked to see (step ST13). More specifically, on the basis of both the coordinate information which is sent thereto from the guidance route information acquiring unit 441 and the coordinates of the center position of the cross cursor which are informed thereto from the cross cursor position determining unit 442, the cross cursor on-route determining unit 443 checks to see whether or not the center of the cross cursor is positioned on the guidance route, more concretely, checks to see whether the center of the cross cursor is positioned in a direction perpendicular to the guidance route and at a distance of a fixed range from the guidance route. In this case, when the cross cursor center position falls within a beltlike region having a fixed margin width which is distant from the guidance route, the cross cursor on-route determining unit assumes that the cross cursor center is positioned on the guidance route.

When, in this step ST13, determining that the cursor center position is not positioned on the guidance route, the cross cursor on-route determining unit ends the highlighting process. In contrast, when, in step ST13, determining that the cursor center is positioned on the guidance route, the cross cursor on-route determining unit then determines a vector a extending toward the direction of the destination (step ST14). More specifically, the destination direction determining unit

451 of the thick line highlight processing unit 45 determines a vector starting from the coordinates of the center position of the cross cursor which are informed thereto from the cross cursor position determining unit 442 of the along-route scroll mode determining unit 44 from the coordinates of the nodes of the link of the guidance route extending toward the direction of the destination, the coordinates being included in the coordinate information sent from the guidance route information acquiring unit 441 of the along-route scroll mode determining unit 44.

The angle θa of the vector a with respect to 0 degrees is then determined (step ST15). More specifically, the destination direction calculating unit 451 determines the angle θa of the vector a determined in step ST14 with respect to 0 degrees (360 degrees), as shown in FIG. 8.

A line segment to be highlighted indicating the direction of the destination corresponding to the angle θa is then determined (step ST16). More specifically, the destination direction determining unit 451 determines a line segment of the cross cursor extending in a direction which is the closest to the direction of the angle θa of the vector a determined in step ST15. Concretely, the destination direction determining unit refers to the table 451a shown in FIG. 9 to determine a line segment to be highlighted indicating the direction of the destination corresponding to the angle θa, and informs the line segment to both the opposite direction determining unit 452 and the thick line highlight direction processing unit 453. The line segment to be highlighted indicating the direction of the destination and a line segment to be highlighted indicating the direction of the place of departure which are shown in FIG. 9 are defined as shown in FIG. 10.

The line segment to be highlighted indicating the direction of the place of departure is then determined (step ST17). More specifically, the opposite direction determining unit 452 determines a line segment of the cross cursor having an opposite relation with the line segment of the cross cursor shown by the information showing the line segment of the cross cursor sent from the destination direction determining unit 451 as the line segment to be highlighted indicating the direction of the place of departure. Concretely, the opposite direction determining unit refers to the table 451a shown in FIG. 9 to determine a line segment of the cross cursor having an opposite relation with a line segment of the cross cursor extending in a direction which is the closest to the direction of the angle θa of the vector a as the line segment to be highlighted indicating the direction of the place of departure, and informs the determined line segment to the thick line highlight direction processing unit 453.

Figure 11:
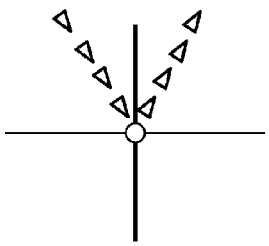
FIG. 11 is a view showing an example of the highlighting of the cross cursor displayed by the navigation device in accordance with Embodiment 1 of the present invention.

The line segment indicating the direction of the destination and the line segment indicating the direction of the place of departure are then highlighted (step ST18). More specifically, the thick line highlight direction processing unit 453 sends the information showing the line segment to be highlighted indicating the direction of the destination which is sent thereto from the destination direction determining unit 451 and the line segment to be highlighted indicating the direction of the place of departure which is sent thereto from the opposite direction determining unit 452 to the display processing unit 47. As a result, for example, the cross cursor in which the line segments extending upwardly and downwardly in the figure are highlighted with thick lines is displayed, as shown in FIG. 11. The thick line highlight direction processing unit 453 also determines a direction key of the remote control 3 corresponding to the highlighted line segment indicating the direction of the destination which is informed thereto from the destination direction determining unit 451 to define the direction key as the direction key for scrolling the map toward the direction of the destination, also determines a direction key of the remote control 3 corresponding to the highlighted line segment indicating the direction of the place of departure which is informed from the opposite direction determining unit 452 to define the direction key as the direction key for scrolling the map toward the direction of the place of departure. The thick line highlight direction processing unit then sends information showing these direction keys for scrolling the map toward the direction of the destination and the direction of the place of departure respectively to the scroll processing unit 46.

The key input information about a direction key is then acquired (step ST19). More specifically, the on-guidance-route scroll processing unit 462 of the scroll processing unit 46 acquires the key input information from the key input information acquiring unit 41. Whether or not the direction key which has been pushed down indicates one of the direction of the destination and the direction of the place of departure is then checked to see (step ST20). More specifically, the on-guidance-route scroll processing unit 462 checks to see whether or not the key input information which it has acquired from the key input information acquiring unit 41 in step ST19 shows one of the direction key for scrolling the map toward the direction of the destination and the direction key for scrolling the map toward the direction of the place of departure.

When, in this step ST20, determining that the direction key which has been pushed down indicates one of the direction of the destination and the direction of the place of departure, the along-route scroll is started (step ST21). More specifically, the on-guidance-route scroll processing unit 462 of the scroll processing unit 46 performs a process of causing the navigation device to carry out the along-route scrolling continuously in either the direction of the destination or the direction of the place of departure according to the information showing the direction key for scrolling the map toward the direction of the destination or the direction key for scrolling the map toward the place of departure which is sent from the thick line highlight direction processing unit 453 of the thick line highlight processing unit 45 while receiving the key input information showing that the direction key is being pushed down from the key input information acquiring unit 41. Then, the navigation device ends the highlighting process.

In contrast, when, in step ST20, determining that the direction key which has been pushed down indicates neither the direction of the destination nor the direction of the place of departure, the cross cursor is returned to the cursor display at the time of the general map scroll mode (step ST22), and, after that, the along-route scroll mode is ended (step ST23). More specifically, when receiving the key input information about a key (e.g., the back key 33 of the remote control 3) different from the direction key which has been used at the time of a transition to the along-route scroll mode from the key input information acquiring unit 41, the along-route scroll mode release determining unit 461 of the scroll processing unit 46 determines that the along-route scroll mode has been released, and informs the on-guidance-route scroll processing unit 462 that the along-route scroll mode has been released. When receiving the notification showing that the along-route scroll mode has been released from the along-route scroll mode release determining unit 461, the on-guidance-route scroll processing unit 462 performs a process of stopping the along-route scrolling. The results of this process are sent to the display processing unit 47. After that, the navigation device ends the highlighting process.

Figure 12:
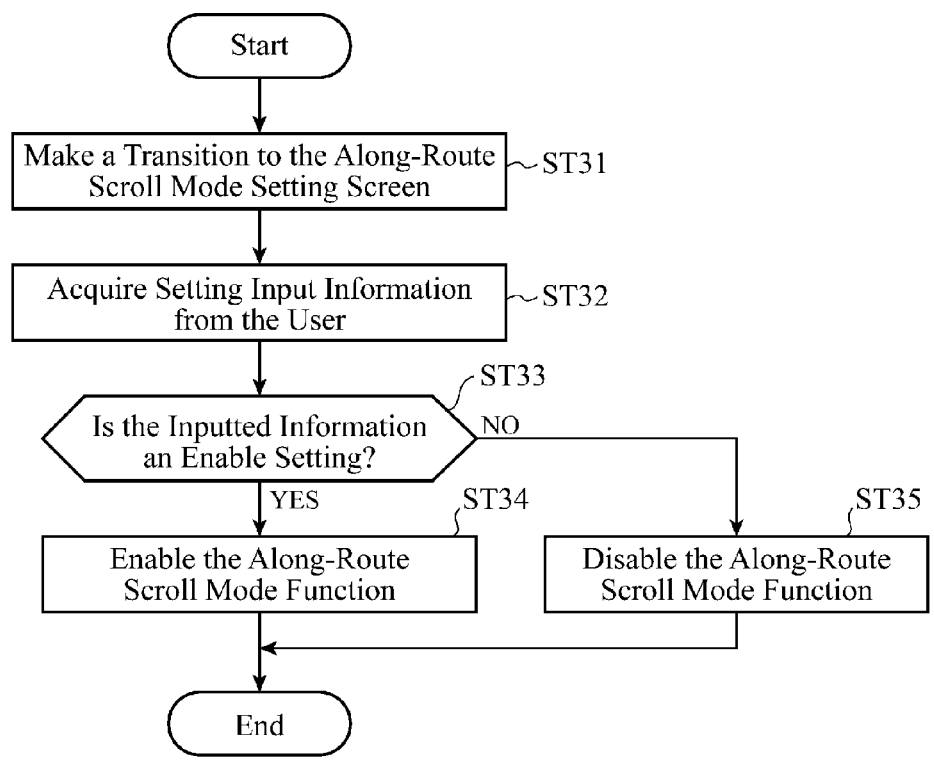
FIG. 12 is a flow chart showing a process of setting whether to enable or disable along-route scrolling which is performed by the navigation device in accordance with Embodiment 1 of the present invention.

(2) A Process of Setting Whether to Enable or Disable the Along-route Scroll Mode FIG. 12 is a flow chart showing the process of setting whether to enable or disable the along-route scroll mode.

Figure 13:
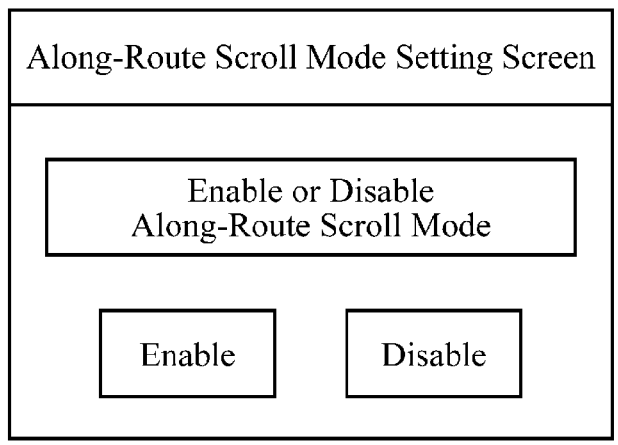
FIG. 13 is a view showing an example of an input screen which enables the user to set whether to enable or disable the along-route scrolling which is performed by the navigation device in accordance with Embodiment 1 of the present invention.

In this process, the navigation device makes a transition to an along-route scroll mode setting screen first (step ST31). When a predetermined operation is carried out, the navigation device makes a transition to an input screen which enables the user to set whether to enable or disable the along-route scroll mode. FIG. 13 shows an example of the input screen which enables the user to set whether to enable or disable the along-route scroll mode.

Setting input information from the user is then acquired (step ST32). More specifically, the along-route scroll mode enable/disable switching unit 42 acquires key input information sent thereto, via the user interface control unit 12, the input control unit 13, and the key input information acquiring unit 41, from a not-shown operation panel.

Whether or not the inputted information shows an enable setting is then checked to see (step ST33). More specifically, the along-route scroll mode enable/disable switching unit 42 checks to see whether the key input information acquired in step ST32 shows either the enable setting or a disable setting. When it is determined, in this step ST33, that the key input information shows the enable setting, the along-route scrolling is enabled (step ST34). More specifically, the along-route scroll mode enable/disable switching unit 42 enables the along-route scroll mode. In this case, the along-route scroll mode determining unit 44 is started, and the navigation device enters a state in which the along-route scrolling can be carried out. After that, the navigation device ends the process.

In contrast, when it is determined, in step ST33, that the key input information does not show the enable setting, the along-route scrolling is disabled (step ST35). More specifically, the along-route scroll mode enable/disable switching unit 42 disables the along-route scroll mode. In this case, the along-route scroll mode determining unit 44 is not started, and the navigation device enters a state in which the along-route scrolling cannot be carried out. After that, the navigation device ends the process.

Figure 14:
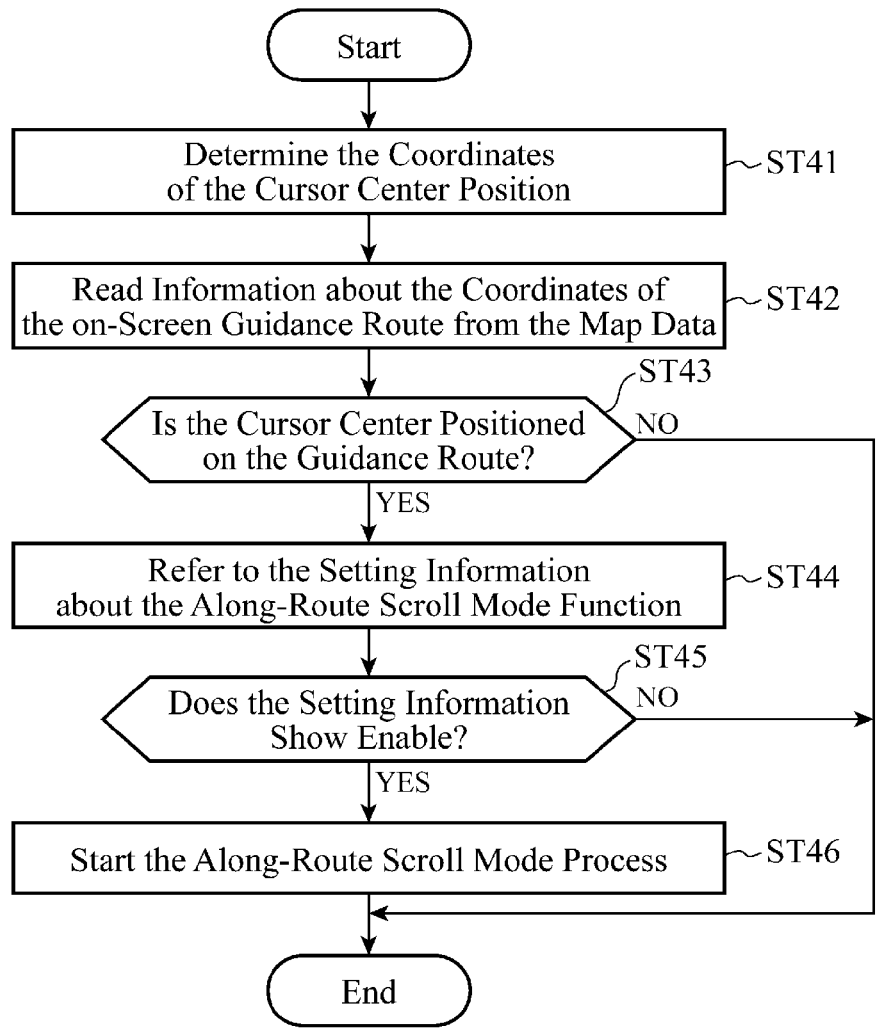
FIG. 14 is a flow chart showing a process of making a transition to the along-route scrolling which is performed by the navigation device in accordance with Embodiment 1 of the present invention.

(3) A Process of Making a Transition to the Along-route Scroll Mode in Consideration of the Enable or Disable Setting FIG. 14 is a flow chart showing the process of making a transition to the along-route scroll mode in consideration of the enable or disable setting.

In this process of making a transition to the along-route scroll mode, the coordinates of the cursor center position are determined first (step ST41). The process of this step ST41 is the same as that carried out in step ST11 of the above-mentioned flow chart of FIG. 7. Coordinate information about the coordinates of the on-screen guidance route is then read from the map data (step ST42). The process of this step ST42 is the same as that carried out in step ST12 of the above-mentioned flow chart of FIG. 7.

Whether or not the cursor center is positioned on the guidance route is then checked to see (step ST43). The process of this step ST43 is the same as that carried out in step ST13 of the above-mentioned flow chart of FIG. 7. When it is determined, in this step ST43, that the cursor center position is not positioned on the guidance route, the process of making a transition to the along-route scroll mode is ended.

In contrast, when it is determined, in step ST43, that the cursor center is positioned on the guidance route, the setting information about the setting of the along-route scroll mode is then referred to (step ST44). More specifically, the along-route scroll mode enable/disable determining unit 43 acquires the information showing whether the along-route scrolling is enabled or disabled, which is set by the along-route scroll mode enable/disable switching unit 42.

Whether or not the setting information shows enable is then checked to see (step ST45). More specifically, the along-route scroll mode enable/disable determining unit 43 checks to see whether the along-route scrolling is enabled or disabled on the basis of the information acquired in step ST44. When it is determined, in this step ST45, that the setting information shows not-enable, that is, the setting information shows disable, the process of making a transition to the along-route scroll mode is ended. In contrast, when it is determined, in step ST45, that the setting information shows enable, the along-route scroll mode process is started (step ST46). More specifically, the along-route scroll mode enable/disable determining unit 43 starts the along-route scroll mode determining unit 44. After that, the navigation device ends the process.

(4) An Along-route Scroll Mode Releasing Process

Figure 15:
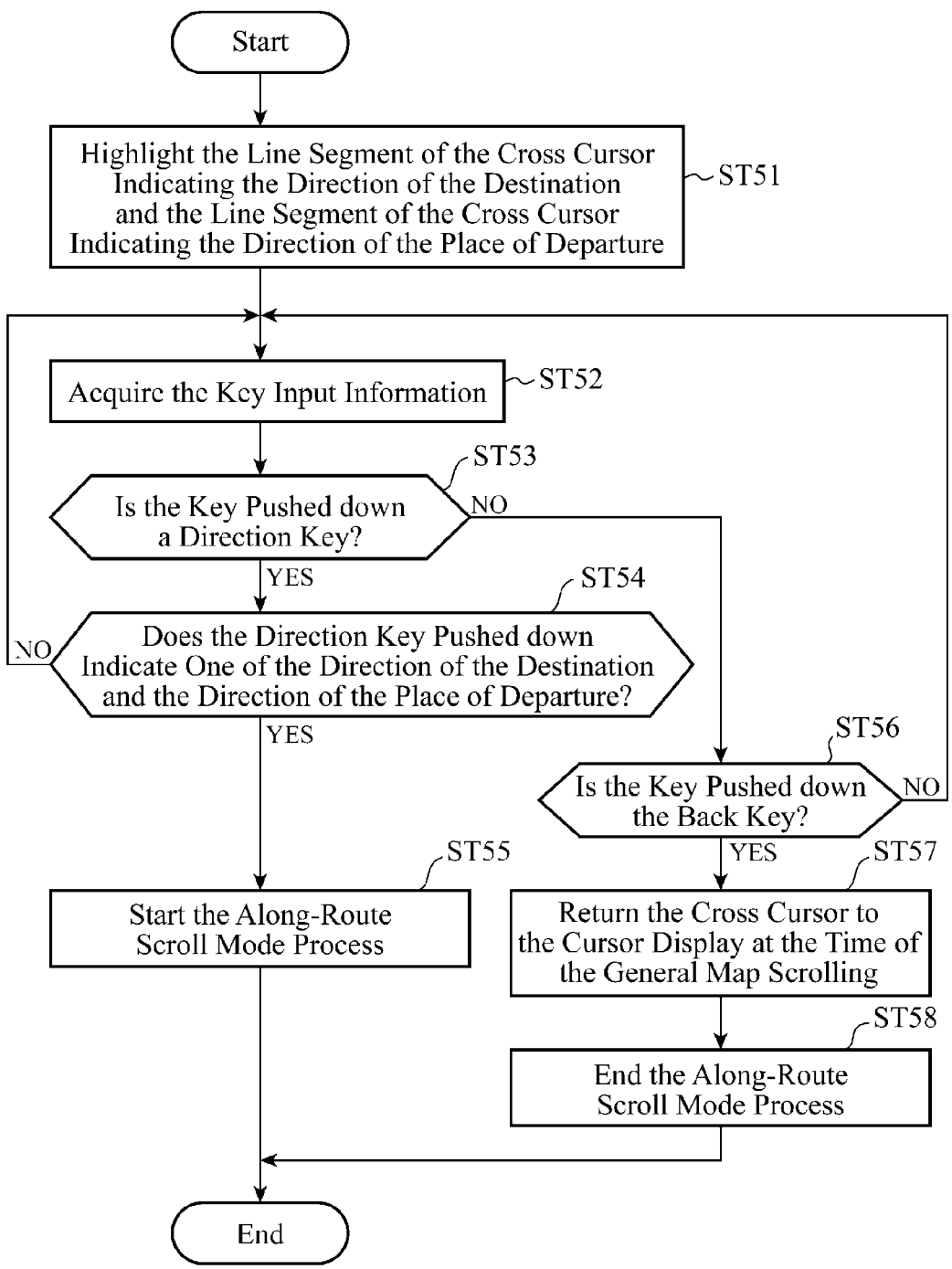
FIG. 15 is a flow chart showing an along-route scroll mode releasing process which is performed by the navigation device in accordance with Embodiment 1 of the present invention.

FIG. 15 is a flow chart showing the along-route scroll mode releasing process of releasing the along-route scroll mode when a key (e.g., the back key 33) other than the direction keys is pushed down.

In the along-route scroll mode releasing process, the line segment of the cross cursor indicating the direction of the destination and the line segment of the cross cursor indicating the direction of the place of departure are highlighted first (step ST51). The process of this step ST51 is implemented through the same processes as those carried out in steps ST11 to ST18 of the above-mentioned flowchart of FIG. 7.

The key input information is then acquired (step ST52). More specifically, the on-guidance-route scroll processing unit 462 of the scroll processing unit 46 acquires the key input information from the key input information acquiring unit 41. Whether or not the key which has been pushed down is a direction key is then checked to see (step ST53). More specifically, the on-guidance-route scroll processing unit 462 checks to see whether the key input information acquired, in step ST52, from the key input information acquiring unit 41 shows a direction key.

When it is determined, in this step ST53, that the key input information shows a direction key, whether or not the direction key which has been pushed down indicates one of the direction of the destination and the direction of the place of departure is then checked to see (step ST54). More specifically, the on-guidance-route scroll processing unit 462 checks to see whether the key input information acquired, in step ST52, from the key input information acquiring unit 41 shows one of the direction key for scrolling the map toward the direction of the destination and the direction key for scrolling the map toward the direction of the place of departure. When it is determined, in this step ST54, that the direction key which has been pushed down indicates neither the direction of the destination nor the direction of the place of departure, the navigation apparatus returns the sequence to step ST52 and repeats the above-mentioned processing.

In contrast, when it is determined, in step ST54, that the direction key which has been pushed down indicates either the direction of the destination or the direction of the place of departure, the along-route scroll mode process is started (step ST55). More specifically, the on-guidance-route scroll processing unit 462 of the scroll processing unit 46 performs a process of causing the navigation device to carry out the along-route scrolling continuously in either the direction of the destination or the direction of the place of departure according to the information showing the direction key for scrolling the map toward the direction of the destination or the direction key for scrolling the map toward the place of departure which is sent from the thick line highlight direction processing unit 453 of the thick line highlight processing unit 45 while receiving the key input information showing that the direction key is being pushed down from the key input information acquiring unit 41. After that, the navigation device ends the along-route scroll mode releasing process.

When it is determined, in above-mentioned step ST53, that the key which has been pushed down is not any direction key, whether or not the key which has been pushed down is the back key is then checked to see (step ST56). More specifically, the along-route scroll mode release determining unit 461 of the scroll processing unit 46 checks to see whether the key input information acquired, in step ST52, from the key input information acquiring unit 41 shows the back key 33.

When it is determined, in this step ST56, that the key which has been pushed down is the back key, the cross cursor is returned to the cursor display at the time of the general map scroll mode (step ST57), and, after that, the along-route scroll mode is ended (step ST58). The processes shown in these steps ST57 and ST58 are the same as those carried out in steps ST22 and ST23 of the above-mentioned flow chart of FIG. 7 respectively. After that, the navigation device ends the along-route scroll mode releasing process.

Figure 16:
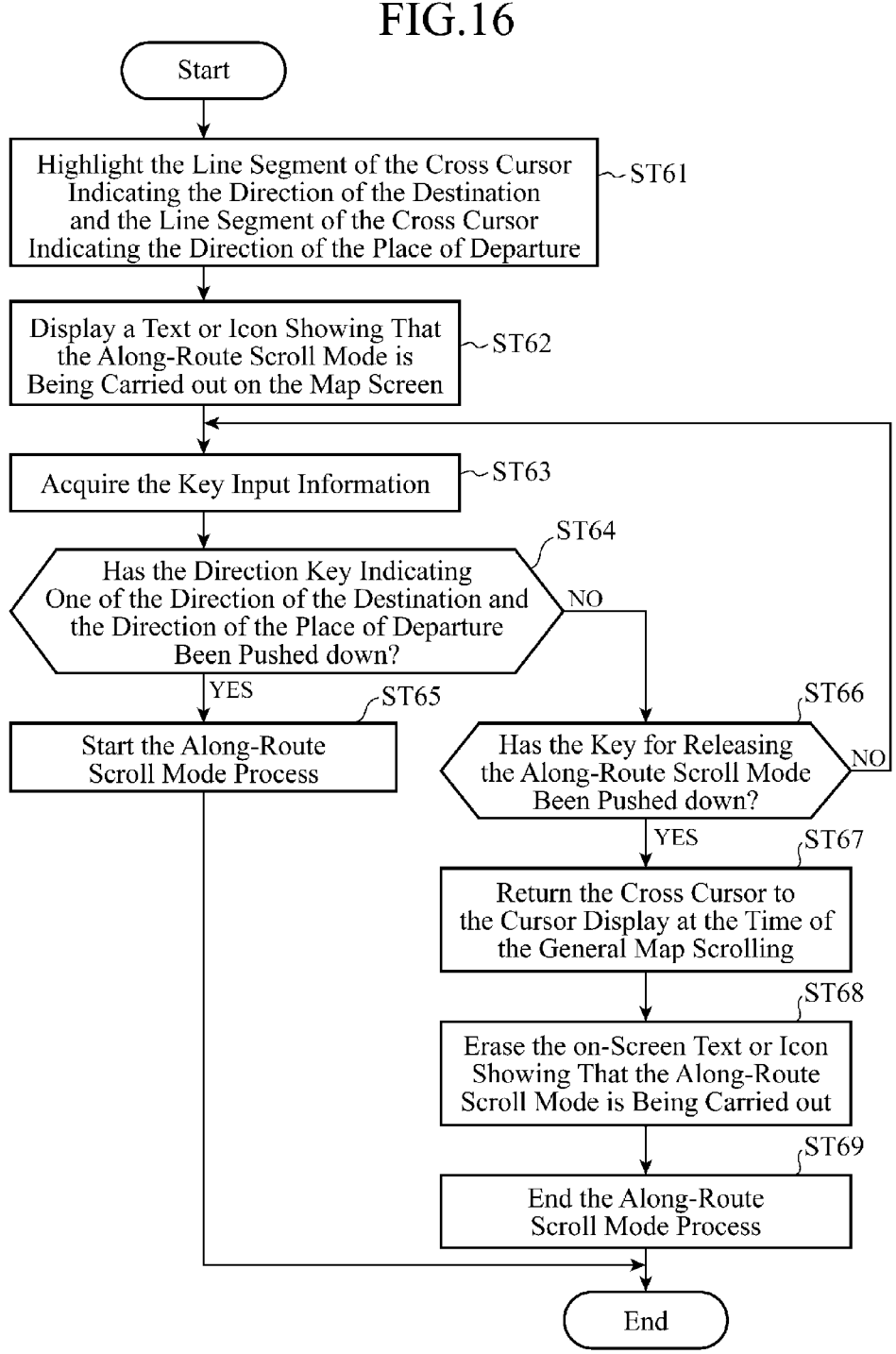
FIG. 16 is a flow chart showing a text or icon display process of displaying a text or icon for notification of the along-route scroll mode which is performed by the navigation device in accordance with Embodiment 1 of the present invention.

(5) A Text or Icon Display Process for Notification of the Along-route Scroll Mode FIG. 16 is a flow chart showing the text or icon display process of displaying a text or icon for notification of the along-route scroll mode.

In this text or icon display process, the line segment of the cross cursor indicating the direction of the destination and the line segment of the cross cursor indicating the direction of the place of departure are highlighted first (step ST61). The process of this step ST61 is implemented through the same processes as those carried out in steps ST11 to ST18 of the above-mentioned flow chart of FIG. 7.

A text or icon showing that the along-route scroll mode is being carried out is then displayed on the on-screen map (step ST62). More specifically, when commanded to start the along-route scroll mode by the cross cursor on-route determining unit 443 of the along-route scroll mode determining unit 44, the along-route scroll mode notification unit 471 of the display processing unit 47 displays either a text as shown in FIG. 5(*a*) or an icon as shown in FIG. 5(*b*) showing that the along-route scrolling is being carried out on the screen of the display unit 8.

The key input information is then acquired (step ST63). More specifically, the on-guidance-route scroll processing unit 462 of the scroll processing unit 46 acquires the key input information from the key input information acquiring unit 41. Whether or not one of the direction key indicating the direction of the destination and the direction key indicating the direction of the place of departure has been pushed down is then checked to see (step ST20). More specifically, the on-guidance-route scroll processing unit 462 checks to see whether the key input information which it has acquired from the key input information acquiring unit 41 in step ST63 shows one of the direction key for scrolling the map toward the direction of the destination and the direction key for scrolling the map toward the direction of the place of departure.

When, in this step ST64, determining that either the direction key indicating the direction of the destination or the direction key indicating the direction of the place of departure has been pushed down, the along-route scroll mode process is started (step ST65). More specifically, the on-guidance-route scroll processing unit 462 of the scroll processing unit 46 performs a process of causing the navigation device to carry out the along-route scrolling continuously in either the direction of the destination or the direction of the place of departure according to the information showing the direction key for scrolling the map toward the direction of the destination or the direction key for scrolling the map toward the place of departure which is sent from the thick line highlight direction processing unit 453 of the thick line highlight processing unit 45 while receiving the key input information showing that the direction key is being pushed down from the key input information acquiring unit 41. After that, the navigation device ends the text or icon display process.

When, in above-mentioned step ST64, determining that neither the direction key indicating the direction of the destination nor the direction key indicating the direction of the place of departure has been pushed down, whether or not the key for releasing the along-route scroll mode has been pushed down is then checked to see (step ST66). More specifically, the on-guidance-route scroll processing unit 462 checks to see whether or not the key input information acquired, in step ST63, from the key input information acquiring unit 41 shows one of a direction key other than the direction key for scrolling the map toward the direction of the destination and the direction key for scrolling the map toward the direction of the place of departure, and the other keys (e.g., the back key 33). When it is determined, in this step ST66, that the key for releasing the along-route scroll mode has not been pushed down, the navigation device returns the sequence to step ST63 and repeats the above-mentioned processing.

In contrast, when it is determined, in step ST66, that the key for releasing the along-route scroll mode has been pushed down, the cross cursor is then returned to the cursor display at the time of the general map scroll mode (step ST67). The process of this step ST67 is the same as that carried out in step ST22 of the above-mentioned flow chart of FIG. 7.

The text or icon showing that the along-route scroll mode is being carried out, which is displayed on the on-screen map, is then erased (step ST68). More specifically, the along-route scroll mode notification unit 471 of the display processing unit 47 erases the text or icon showing that the along-route scrolling is being carried out, which is displayed on the screen of the display unit 8. The along-route scroll mode process is then ended (step ST69). The process of this step ST69 is the same as that carried out in step ST23 of the above-mentioned flow chart of FIG. 7. After that, the navigation device ends the text or icon display process.

Figure 17:
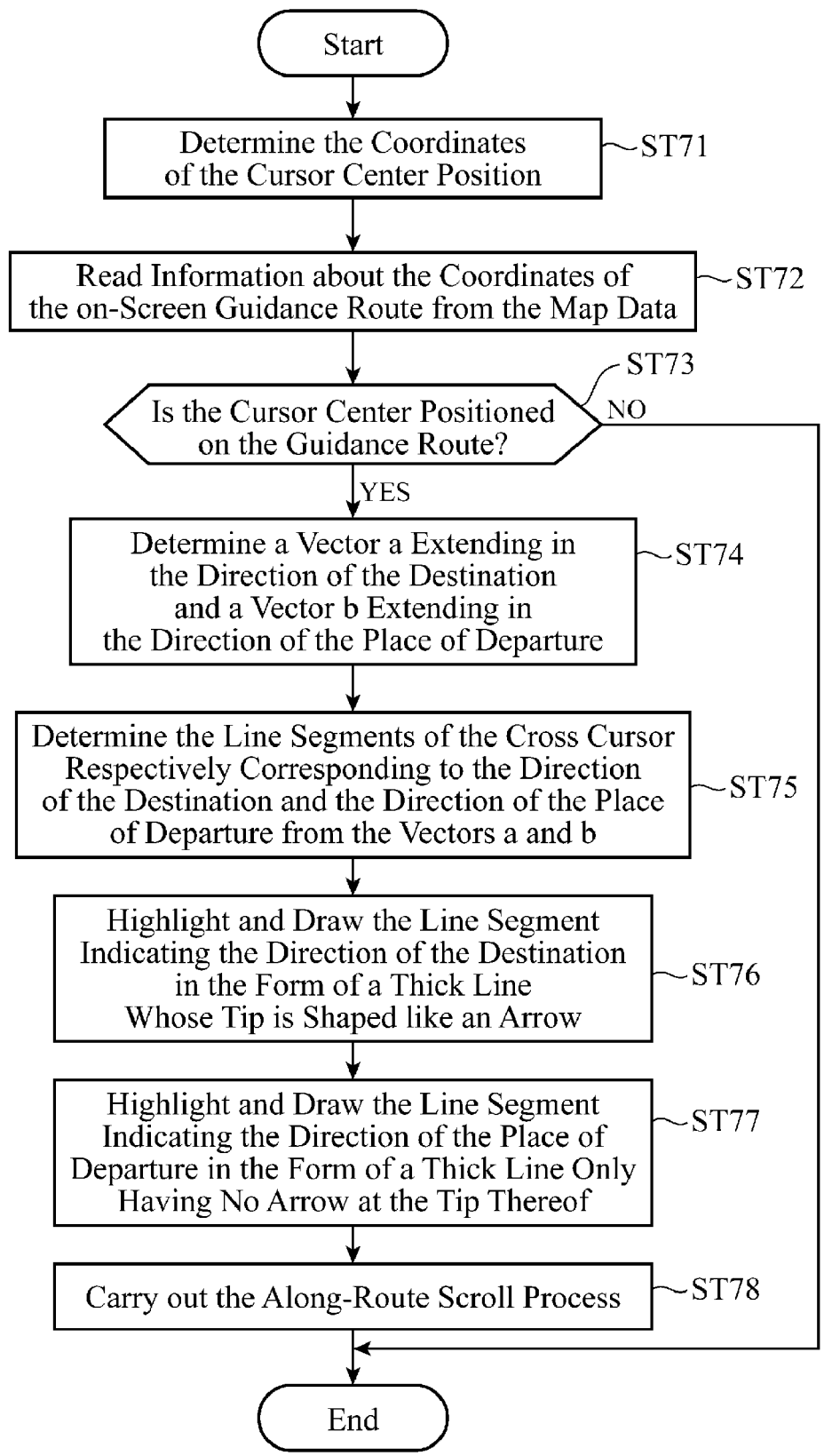
FIG. 17 is a flow chart showing a line segment highlighting process of highlighting line segments in different forms at the time of the along-route scroll mode which is performed by the navigation device in accordance with Embodiment 1 of the present invention.

(6) A Process of Highlighting the Line Segments in Different Forms at the Time of the Along-route Scroll Mode FIG. 17 is a flow chart showing the line segment highlighting process of highlighting the line segments of the cross cursor respectively indicating the direction of the destination and the direction of the place of departure in different forms at the time of the along-route scroll mode.

In this line segment highlighting process, the coordinates of the cursor center position are determined first (step ST71). The process of this step ST71 is the same as that carried out in step ST11 of the above-mentioned flow chart of FIG. 7. Coordinate information about the coordinates of the on-screen guidance route is then read from the map data (step ST72). The process of this step ST72 is the same as that carried out in step ST12 of the above-mentioned flow chart of FIG. 7.

Whether or not the cursor center is positioned on the guidance route is then checked to see (step ST73). The process of this step ST73 is the same as that carried out in step ST13 of the above-mentioned flow chart of FIG. 7. When it is determined, in this step ST73, that the cursor center position is not positioned on the guidance route, the line segment highlighting process is ended.

A vector a extending in the direction of the destination and a vector b extending in the direction of the place of departure are then determined (step ST74). More specifically, the destination direction determining unit 451 of the thick line highlight processing unit 45 determines the vector a starting from the coordinates of the center position of the cross cursor which are informed thereto from the cross cursor position determining unit 442 of the along-route scroll mode determining unit 44 from the coordinates of the nodes of the link of the guidance route extending toward the direction of the destination, the coordinates being included in the coordinate information sent from the guidance route information acquiring unit 441 of the along-route scroll mode determining unit 44, and also determines the vector b starting from the coordinates of the center position of the cross cursor from the coordinates of the nodes of a link of the guidance route extending toward the direction of the place of departure, the coordinates being included in the coordinate information.

The line segments of the cross cursor respectively corresponding to the direction of the destination and the direction of the place of departure are then determined from the vectors a and b (step ST75). More specifically, the destination direction determining unit 451 determines the line segments of the cross cursor respectively extending in directions which are the closest to the vectors a and b determined in step ST74. More specifically, the destination direction determining unit refers to the table 451a shown in FIG. 9 to determine, as the line segments of the cross cursor respectively corresponding to the direction of the destination and the direction of the place of departure, the line segments respectively corresponding to the vectors a and b, and informs them to the thick line highlight direction processing unit 453.

The line segment indicating the direction of the destination is then highlighted and drawn in the form of a thick line whose tip is shaped like an arrow (step ST76). More specifically, the thick line highlight direction processing unit 453 creates a thick line whose tip is shaped like an arrow, the thick line showing the line segment indicating the direction of the destination informed from the destination direction determining unit 451, and sends information showing this thick line with an arrow to the display processing unit 47.

Figure 6:
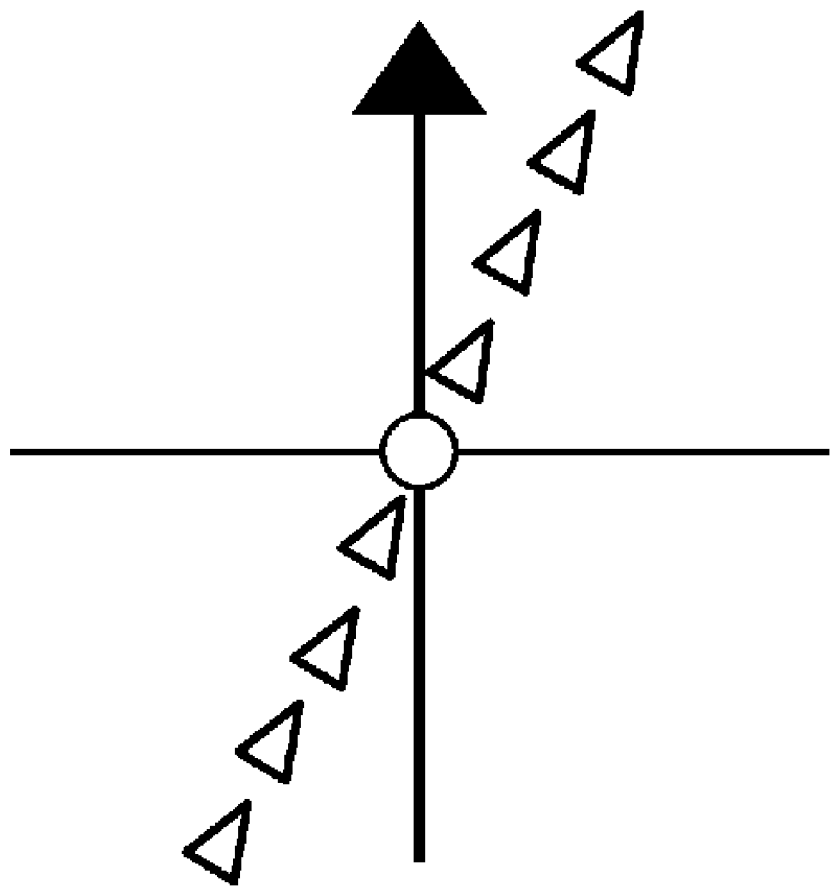
FIG. 6 is a view showing another display form of the cursor for use in the navigation device in accordance with Embodiment 1 of the present invention.

The line segment indicating the direction of the place of departure is then highlighted and drawn in the form of a thick line having no arrow at the tip thereof (step ST77). More specifically, the thick line highlight direction processing unit 453 creates a thick line having no arrow at the tip thereof, the thick line showing the line segment indicating the direction of the place of departure informed from the destination direction determining unit 451, and sends information showing this thick line to the display processing unit 47. Through the processes of these steps ST76 and ST77, the cross cursor, as shown in FIG. 6, in which the direction of the destination is highlighted with the thick line having an arrow and the direction of the place of departure is highlighted with the thick line having no arrow is displayed.

The along-route scroll process is then carried out (step ST78). More specifically, the on-guidance-route scroll processing unit 462 of the scroll processing unit 46 performs a process of causing the navigation device to carry out the along-route scrolling continuously in either the direction of the destination or the direction of the place of departure according to the information showing the direction key for scrolling the map toward the direction of the destination or the direction key for scrolling the map toward the place of departure which is sent from the thick line highlight direction processing unit 453 of the thick line highlight processing unit 45 while receiving the key input information showing that the direction key is being pushed down from the key input information acquiring unit 41. After that, the navigation device ends the line segment highlighting process.

As previously explained, when the cross cursor is placed on the guidance route, the navigation device in accordance with Embodiment 1 of the present invention is configured in such a way as to make a transition to the along-route scroll mode, thicken and highlight both the line segment indicating the direction of the destination of the cross cursor, and the line segment indicating the direction opposite to that of the above-mentioned line segment, when the direction key indicating the same direction as that of the thickened and highlighted line segment of the cross cursor extending in the direction of the destination is pushed down, scroll the map toward the direction of the destination along the guidance route, and, when the direction key indicating the same direction as that of the line segment extending in the direction opposite to that of the line segment of the cross cursor extending in the direction of the destination is pushed down, scroll the map toward the direction of the place of departure along the guidance route. Therefore, the navigation device in accordance with Embodiment 1 of the present invention can carry out the along-route scrolling in either of both directions, such as the direction of the destination and the direction of the place of departure, regardless of the shape of the guidance route, thereby improving the user-friendliness of the navigation device.

Furthermore, because an existing along-route scrolling function is always enabled in a conventional navigation device, if, while operating a map scrolling function, the user manually stops the scrolling when the cross cursor is close to the guidance route, the cross cursor overlaps the guidance route and the conventional navigation device makes a transition to the along-route scroll mode regardless of the user's intention. In contrast with this, because the navigation device in accordance with this Embodiment 1 is configured in such a way as to switch between enabling and disabling the along-route scrolling, the navigation device can prevent a non-intended transition to the along-route scroll mode from occurring and enables the user to perform a map scrolling operation manually and comfortably by disabling the along-route scroll mode.

Furthermore, the conventional navigation device is configured in such a way as to, in the existing along-route scroll mode, enable the user to operate a direction key other than the direction keys respectively corresponding to the direction of the destination and the direction of the place of departure to release the along-route scroll mode. Although there is a possibility that it is hard for some users to understand this operation method, because the navigation device in accordance with this Embodiment 1 is configured in such a way as to enable the user to release the along-route scroll mode by using a key (e.g., the back key) different from the keys (direction keys) used in the along-route scroll mode, this releasing method which the navigation device provides for the user is easier for the user to understand.

Furthermore, in the existing along-route scrolling, the user can know whether the conventional navigation device is placed in the along-route scroll mode only from a change in the design of the cross cursor. In contrast, because the navigation device in accordance with this Embodiment 1 is configured in such a way as to supplementally display a text or icon specifying that the navigation device is placed in the along-route scroll mode on a navigation screen☐, it becomes able to show that the navigation device is placed in the along-route scroll mode more explicitly, thereby improving the capability of notifying whether the conventional navigation device is placed in the along-route scroll mode to the user.

In addition, in the existing along-route scrolling, as the display forms in which the line segments of the cross cursor respectively indicating the direction of the destination and the direction of the place of departure are displayed, highlighting with the same thick line is used. In contrast, because the navigation device in accordance with this Embodiment 1 is configured in such a way as to display the line segments of the cross cursor respectively indicating the direction of the destination, which is the direction of the along-route scrolling, and the direction of the place of departure in different forms respectively, the navigation device enables the user to distinguish between the direction of the destination and the direction of the place of departure at a glance, thereby improving the user's cognition of the direction of the destination and the direction of the place of departure.

INDUSTRIAL APPLICABILITY

As mentioned above, in order to carry out an along-route scrolling operation in either of both directions, such as the direction of the destination and the direction of the place of departure, regardless of the shape of a guidance route, and provide excellent user-friendliness, the navigation device in accordance with the present invention is configured in such a way as to include: a route search processing unit for searching for a guidance route leading from the place of departure to the destination; a display unit for displaying the guidance route on a map; an along-route scroll mode determining unit for determining whether or not a cursor is placed on the guidance route searched for by the route search processing unit; a thick line highlight processing unit for highlighting line segments in a thick line form; an input unit having a plurality of direction keys; a scroll processing unit for scrolling the map toward the direction of the destination along the guidance route; and a display processing unit for displaying the map on which the scroll process is performed by the scroll processing unit on the display unit. Therefore, the navigation device in accordance with the present invention is suitable for use as a navigation device that scrolls the on-screen map and that guides the user to the destination along the guidance route.

The invention claimed is:

1. A navigation device comprising:
a route search processing unit for searching for a guidance route leading from a place of departure to a destination;
a display unit for displaying the guidance route which is searched for by said route search processing unit on a map;
an along-route scroll mode determining unit for determining whether or not a cursor having a plurality of line segments extending respectively in a plurality of directions formed on a screen of said display unit is placed on the guidance route which is searched for by said route search processing unit;
a highlight processing unit for, when said along-route scroll mode determining unit determines that the cursor is placed on the guidance route, making a transition to an along-route scroll mode to highlight both a line segment of said cursor extending in a direction of the destination and a line segment of said cursor extending in a direction opposite to that of said line segment;
an input unit having a plurality of direction keys indicating a plurality of directions respectively;
a scroll processing unit for, when a direction key of said input unit indicating a same direction as the line segment of the cursor extending in the direction of the destination which is highlighted by said highlight processing unit is pushed down, scrolling the map toward the direction of the destination along the guidance route, and for, when a direction key of said input unit indicating a same direction as the line segment of the cursor extending in the direction opposite to that of the line segment of the cursor extending in the direction of the destination is pushed down, scrolling the map toward the direction of the place of departure along the guidance route; and
a display processing unit for displaying the map on which the scroll process is performed by said scroll processing unit on said display unit.

2. The navigation device according to claim 1, wherein said navigation device includes an along-route scroll mode enable/disable switching unit for enabling or disabling the along-route scroll according to an operation on the input unit, and the along-route scroll mode determining unit determines whether or not the cursor is placed on the guidance route only when the along-route scroll is enabled by said along-route scroll mode enable/disable switching unit.

3. The navigation device according to claim 1, wherein the scroll processing unit includes an on-guidance-route scroll processing unit continues the along-route scroll while a direction key disposed in the input unit is pushed down, and, when a key other than the direction keys is operated, releases the along-route scroll mode to stop the scroll along the guidance route.

4. The navigation device according to claim 1, wherein the display processing unit includes an along-route scroll mode notifying unit for, when the navigation device is operating in the along-route scroll mode, displaying a text or icon notifying that the navigation device is operating in the along-route scroll mode on the map displayed on the display unit.

5. The navigation device according to claim 1, wherein the display processing unit includes a cursor display form control unit for displaying both the line segment of the cursor extending in the direction of the destination and the line segment of the cursor extending in the direction opposite to that of the line segment of the cursor extending in the direction of the destination, which are highlighted by the highlight processing unit, in different forms respectively.

* * * * *